(12) United States Patent
Jreij et al.

(10) Patent No.: US 10,862,900 B2
(45) Date of Patent: Dec. 8, 2020

(54) SYSTEM AND METHOD FOR DETECTING ROGUE DEVICES ON A DEVICE MANAGEMENT BUS

(71) Applicant: Dell Products, L.P., Round Rock, TX (US)

(72) Inventors: Elie Antoun Jreij, Pflugerville, TX (US); Choudary Maddukuri, Austin, TX (US); Ajeesh Kumar, Bangalore (IN); Kala Sampathkumar, Bangalore (IN); Pablo R. Arias, Austin, TX (US); Rama Rao Bisa, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 182 days.

(21) Appl. No.: 16/170,494

(22) Filed: Oct. 25, 2018

(65) Prior Publication Data
US 2020/0137079 A1 Apr. 30, 2020

(51) Int. Cl.
*H04L 29/06* (2006.01)
*G06F 13/42* (2006.01)
*G06F 16/27* (2019.01)

(52) U.S. Cl.
CPC ........ *H04L 63/126* (2013.01); *G06F 13/4282* (2013.01); *G06F 16/27* (2019.01);
(Continued)

(58) Field of Classification Search
CPC ....... H04L 63/12; H04L 63/126; H04L 63/08; H04L 63/0876; H04L 63/14; H04L 63/1483; H04L 63/1458; H04L 63/1408; H04L 63/10; H04L 63/101; H04W 12/12; H04W 12/1202; G06F 16/27; G06F 2213/0026; G06F 2213/0028; G06F 13/42; G06F 13/4282
See application file for complete search history.

(56) References Cited

U.S. PATENT DOCUMENTS

| 8,930,609 B2 * | 1/2015 | Natu ..................... H04L 63/101 710/315 |
| 10,242,176 B1 * | 3/2019 | Sathyanarayana ...... G06F 21/44 |

(Continued)

*Primary Examiner* — Kristine L Kincaid
*Assistant Examiner* — Shaqueal D Wade
(74) *Attorney, Agent, or Firm* — Fogarty LLP

(57) ABSTRACT

Embodiments provide methods and systems for detecting rogue endpoints on a device management bus. A communications controller configured as a bus owner initiates discovery of managed devices coupled to the bus and generate a unique identifier for each managed device. The communications controller transmits a bus configuration message to the managed devices, including the respective unique identifiers. The managed devices are configured as bus endpoints based on the bus configuration message. The managed devices also capture the bus address of the communications controller from the received bus configuration message. Messages received by a managed device are authenticated as originating from the communications controller if the messages include the unique identifier provided to that managed device. The messages may be further authenticated by comparing the bus address of the message sender against the captured bus address of the communications controller.

20 Claims, 5 Drawing Sheets

(52) U.S. Cl.
CPC .. *H04L 63/0876* (2013.01); *G06F 2213/0026* (2013.01); *G06F 2213/0028* (2013.01)

(56) References Cited

U.S. PATENT DOCUMENTS

| | | | | |
|---|---|---|---|---|
| 2016/0254925 | A1* | 9/2016 | Riedel | G06F 13/4068 |
| | | | | 710/110 |
| 2019/0149994 | A1* | 5/2019 | Van Antwerp | H04W 8/005 |
| | | | | 726/4 |
| 2019/0236313 | A1* | 8/2019 | Bush | H04L 63/0823 |
| 2019/0312839 | A1* | 10/2019 | Grimm | H04L 63/1416 |

\* cited by examiner

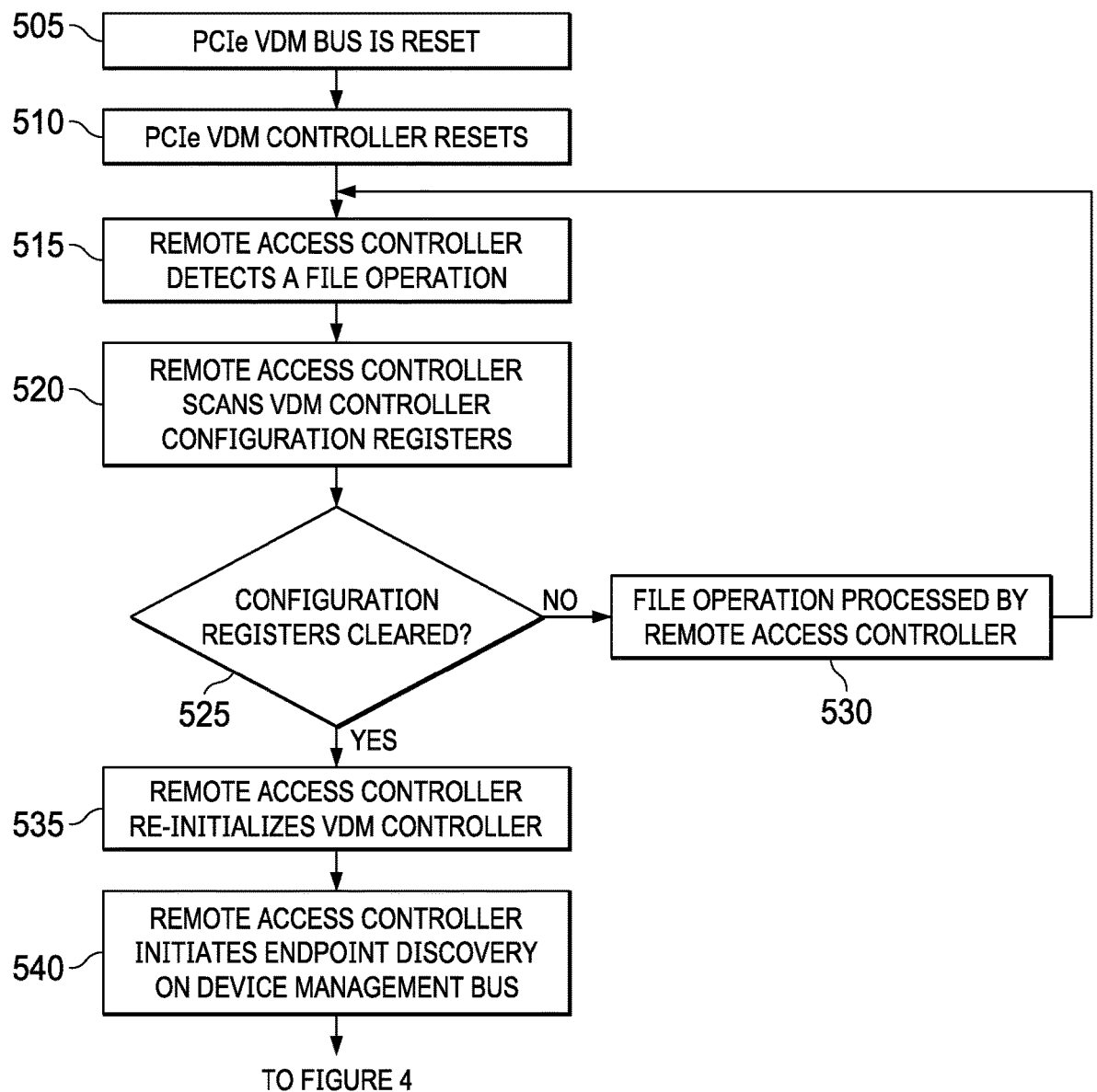

SYSTEM AND METHOD FOR DETECTING ROGUE DEVICES ON A DEVICE MANAGEMENT BUS

FIELD

The present disclosure generally relates to Information Handling Systems (IHSs), and, more particularly, to the management of interfaces and devices that comprise IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS includes buses that are used to communicate signals, such as transmitting data, between the various components that comprise an IHS. Some bus protocols may limit bus transmissions to a bus owner and/or restrict transmissions by bus endpoints, while other bus protocols may allow for bus transmissions by all bus endpoints. Rogue bus endpoints may exploit this vulnerability by flooding the bus with messages to other endpoints. Such denial-of-service attacks consume bus bandwidth and may compromise the operations of the devices coupled to the bus endpoint.

SUMMARY

In various embodiments, a system detects rogue devices on a device management bus. The system includes: a communications controller configured as a bus owner of the device management bus and further configured to: initiate discovery of a plurality of managed devices coupled to the device management bus; generate a unique identifier for each of the managed devices; generate a bus configuration message including the respective unique identifier generated for each managed device; and transmit the bus configuration messages to the respective managed devices; and the plurality of managed devices, each configured as an endpoint of the device management bus based on a received bus configuration message, and each further configured to: capture a bus address of the communications controller from the received bus configuration message; receive, on the device management bus, a first message from a sender at a first bus address, the message including a sender identifier; and authenticate the sender based on evaluation of the first bus address against the captured bus address, and of the sender identifier against the unique identifier provided to the respective managed device.

In additional system embodiments, each of the plurality of managed devices is further configured to store the first bus address if the sender is not authenticated. In additional system embodiments, each of the plurality of managed devices is further configured to discard the first message if the sender is not authenticated. In additional system embodiments, the communications controller is further configured to query the plurality of managed devices for rogue endpoints. In additional system embodiments, the communications controller is further configured to disable the rogue endpoints on the device management bus. In additional system embodiments, the device management bus is a PCIe (Peripheral Component Interconnect express) VDM (Vendor Defined Message) bus for communicating MCTP (Management Component Transport Protocol) messages. In system embodiments, the system further includes a remote access controller configured to query a plurality of configuration registers of the communications controller upon every file operation. In additional system embodiments, the remote access controller is further configured to re-initialize the communications controller upon determining the plurality of configuration registers have been cleared.

In various embodiments, a method detects rogue devices on a device management bus by a communications controller configured as a bus owner. The method includes: initiating discovery of a plurality of managed devices coupled to the device management bus; generating a unique identifier for each of the managed devices; generating a bus configuration message including the respective unique identifier generated for each managed device; and transmitting the bus configuration messages to the respective managed devices, wherein each of the managed devices is configured to: capture a bus address of the communications controller from the received bus configuration message; receive, on the device management bus, a first message from a sender at a first bus address, the message including a sender identifier; and authenticate the sender based on evaluation of the first bus address against the captured bus address, and of the sender identifier against the unique identifier provided to the respective managed device.

In additional method embodiments, each of the plurality of managed devices is further configured to store the first bus address if the sender is not authenticated. In additional method embodiments, each of the plurality of managed devices is further configured to discard the first message if the sender is not authenticated. In additional embodiments, the method further includes querying, by the communications controller, the plurality of managed devices for rogue endpoints. In additional embodiments, the method further includes disabling the rogue endpoints on the device management bus. In additional method embodiments, the device management bus is a PCIe VDM (Vendor Defined Message) bus for communicating MCTP (Management Component Transport Protocol) messages. In additional embodiments, the method further includes querying, by a remote access controller, a plurality of configuration registers of the communications controller as part of a file operation of the remote access controller. In additional embodiments, the method further includes reinitializing, by the remote access controller, the communications controller upon determining the plurality of configuration registers have been cleared.

In various embodiments, a computer-readable storage device is configured for detecting rogue devices on a device management bus by a communications controller configured as a bus owner of the device management bus and having program instructions stored thereon that, upon execution by one or more processors, cause the one or more processors to: initiate discovery of a plurality of managed devices coupled to the device management bus; generate a unique identifier for each of the managed devices; generate a bus configuration message including the respective unique identifier generated for each managed device; and transmit the bus configuration messages to the respective managed devices, wherein each of the managed devices is configured to: capture a bus address of the communications controller from the received bus configuration message; receive, on the device management bus, a first message from a sender at a first bus address, the message including a sender identifier; and authenticate the sender based on evaluation of the first bus address against the captured bus address, and of the sender identifier against the unique identifier provided to the respective managed device.

In additional storage device embodiments, the program instructions further causing the one or more processors to query the plurality of managed devices for rogue endpoints identified by the managed devices as unauthenticated message senders. In additional storage device embodiments, the program instructions further causing the one or more processors to disable the rogue endpoints on the device management bus. In additional storage device embodiments, the device management bus is a PCIe VDM (Vendor Defined Message) bus for communicating MCTP (Management Component Transport Protocol) messages.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 5 is a flowchart describing certain steps of a method, according to some embodiments, for detecting and recovering from the reset of a device management bus.

DETAILED DESCRIPTION

Remote management of IHSs supports the centralized administration of virtualized systems that are configured using the remotely managed IHSs. Remote management of an IHS may be implemented using components such as the remote access controller described herein that monitors various aspects of the operation of the IHS. Such monitoring may be implemented using sideband bus communications between the remote access controller and components of the IHS being managed by the remote access controller. As described, rogue devices coupled to a bus may render the bus inoperable by flooding bus endpoints with peer-to-peer messages that are supported by the bus protocol, such as in PCIe (Peripheral Component Interconnect express) VDM (Vendor Defined Messages) bus communications. Periods of interoperability of such device management buses and resource exhaustion due to rogue endpoints may prevent effective management of the IHS by the remote access controller. Embodiments described herein describe methods and system for detecting rogue endpoints on a device management bus.

Figure 1:
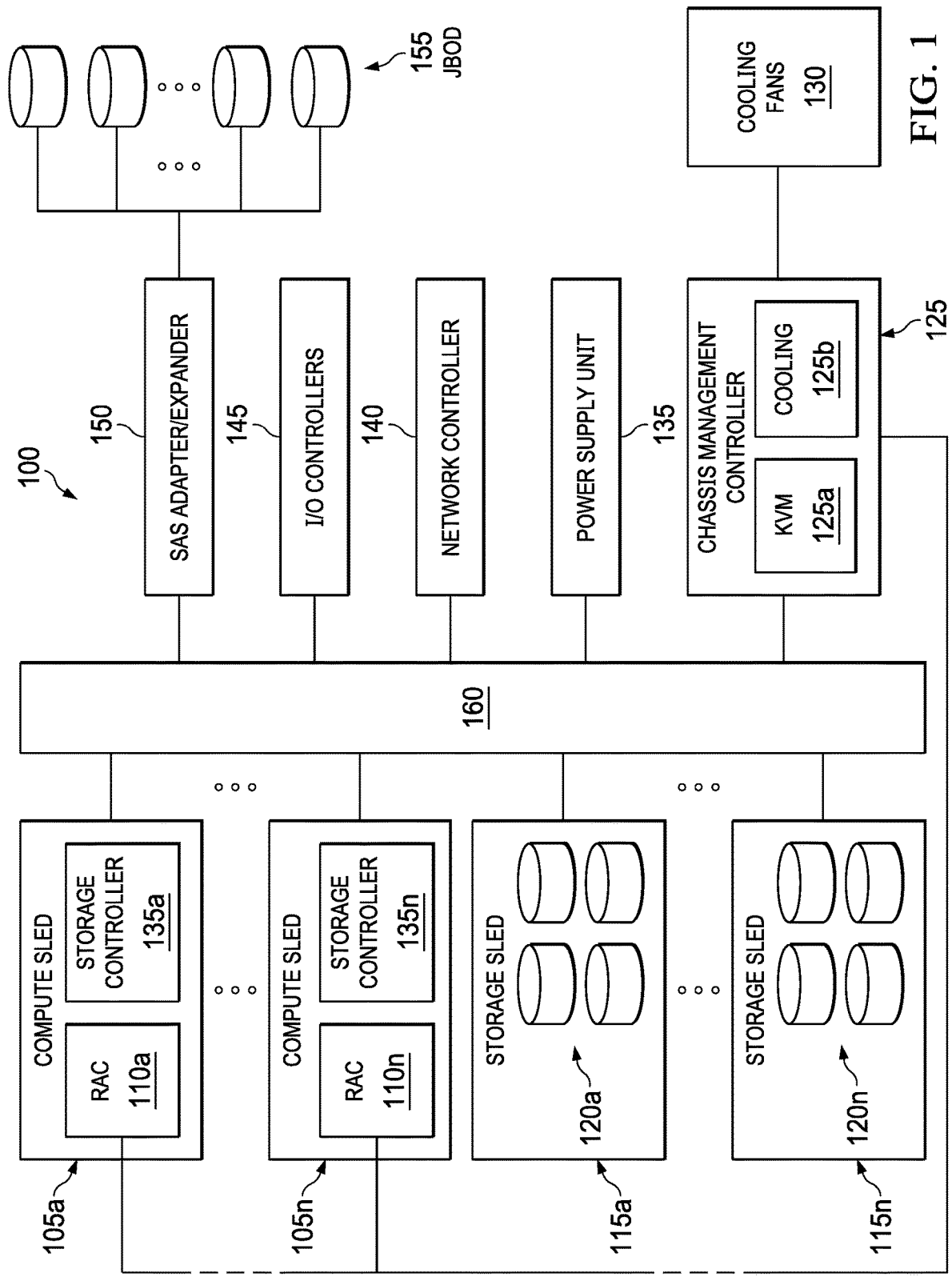
FIG. 1 is a diagram illustrating certain components of a chassis, according to some embodiments that includes a plurality of IHSs configured for detecting rogue devices on a device management bus.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute and storage sleds 105a-n, 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
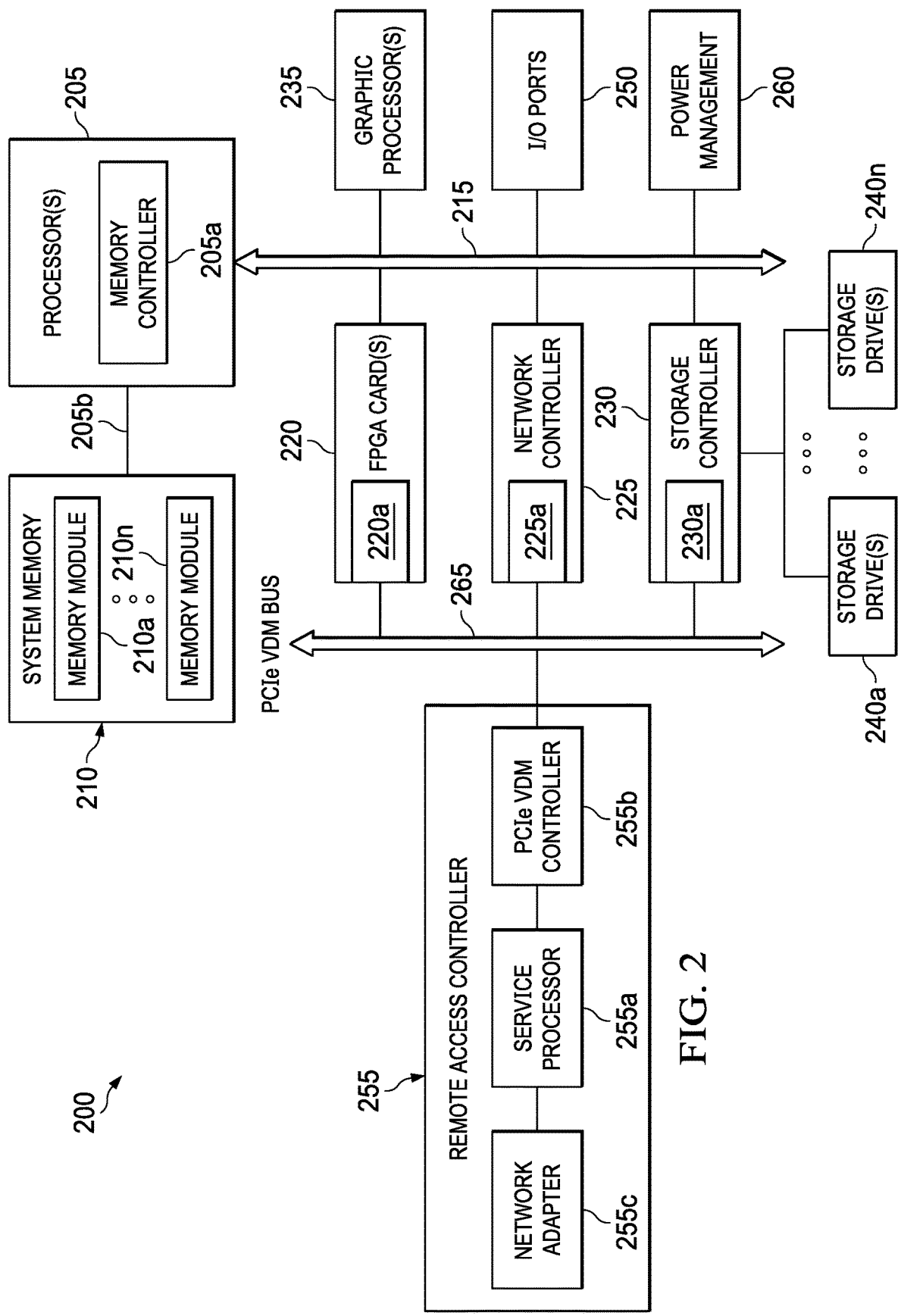
FIG. 2 is diagram illustrating certain components of an IHS configured, according to some embodiments, for detecting rogue devices on a device management bus.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controller 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also may be remotely located.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface directly with the chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105a-n, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255d, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225b may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various devices 220, 225, 230 of an IHS via a sideband interface. In such embodiments, the monitoring and administration messaging may be implemented using MCTP (Management Component Transport Protocol). In some embodiments, the MCTP communications may be transmitted on sideband PCIe bus 265 via Vendor Defined Messages (VDMs) such that sideband device management bus 265 may be referred to as a PCIe VDM bus. In some embodiments, the service processor 255d may utilize a VDM controller 255b to manage communications with MCTP-capable managed devices 220, 225, 230 via a PCIe bus 265 (i.e., PCIe root complex).

The VDM controller 255b may implement the MCTP device management communications between the remote access controller 255 and the managed devices 220, 225, 230 of the IHS 200 via the sideband PCIe bus 265. As described, certain bus protocols, including PCIe, allow message broadcasts by all bus endpoints. In scenarios where a bus endpoint, such as managed devices 220, 225, 230, is compromised or malfunctions, the rogue endpoint may flood the PCIe bus 265 with messages. In this manner, a rogue endpoint may consume PCIe bus 265 bandwidth and burden other endpoints with messages in a manner that may affect the operation of the endpoints and may compromise the ability of the remote access controller 255 to perform sideband monitoring and administration of the managed devices 220, 225, 230.

Figure 3:
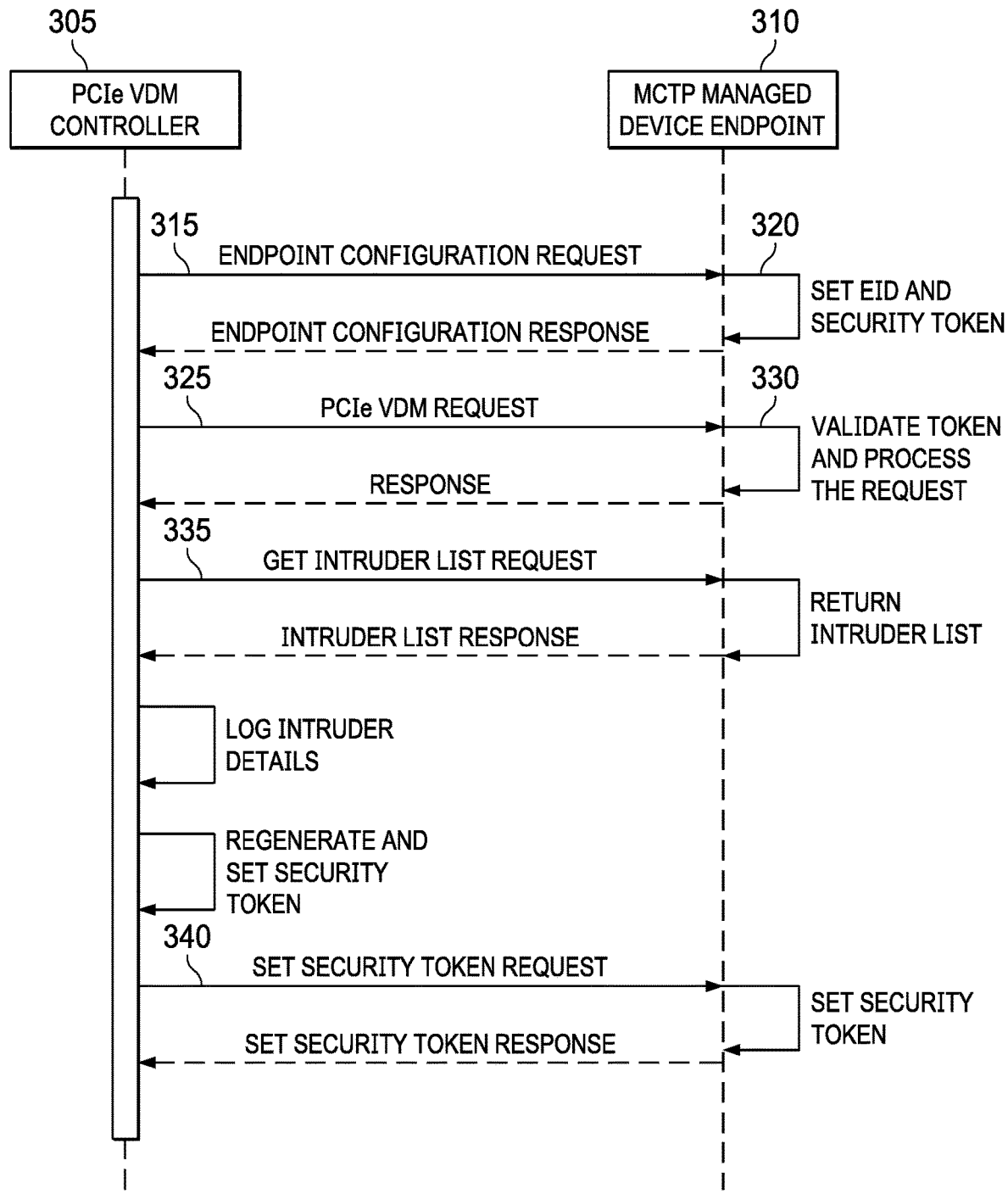
FIG. 3 is a swim-lane diagram illustrating certain operations of a remote management controller and a device management bus endpoint in detecting rogue devices on a device management bus.
Figure 4:
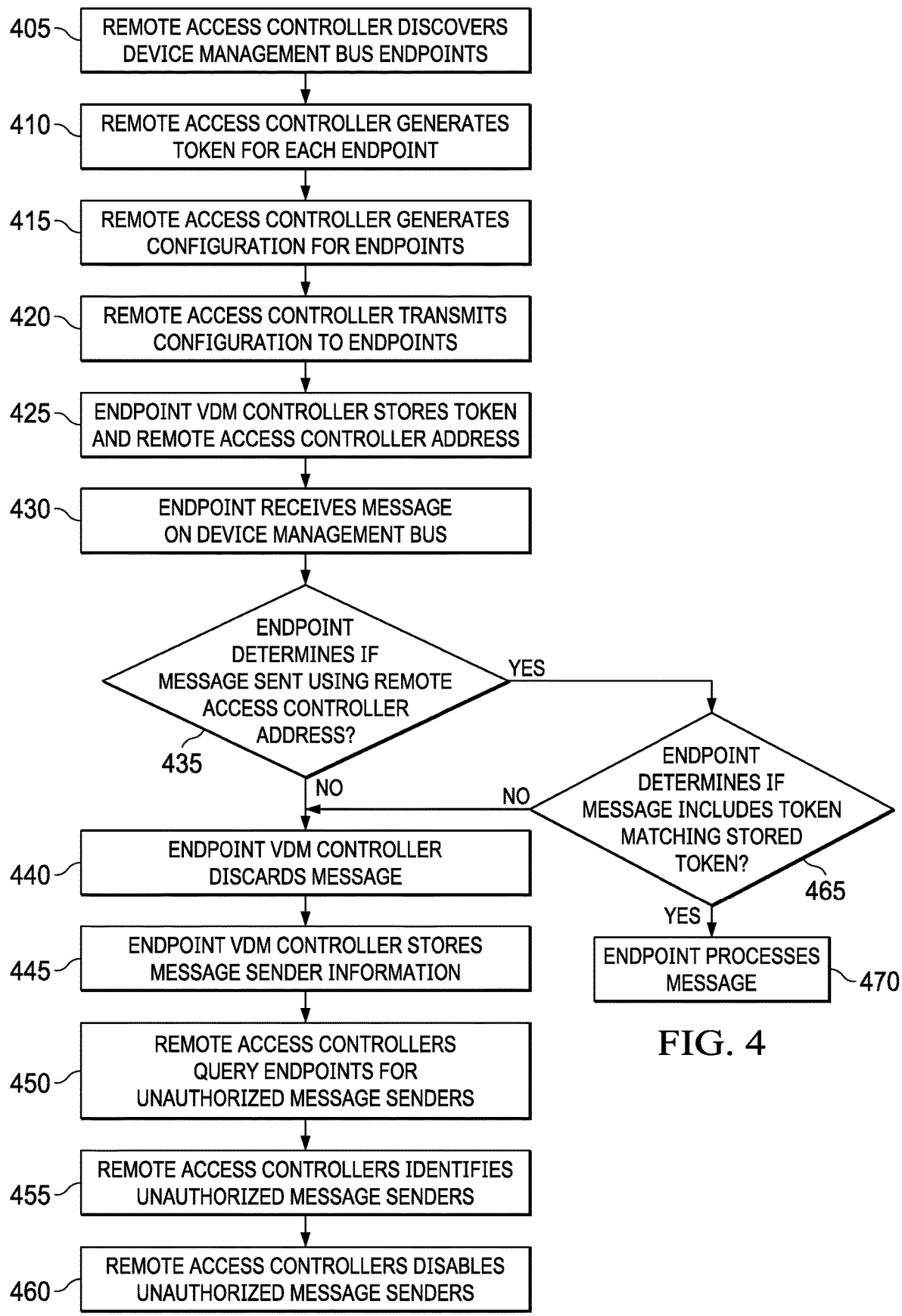
FIG. 4 is a flowchart describing certain steps of a method, according to some embodiments, for detecting rogue devices on a device management bus.

As described in additional detail with regard to the embodiments of FIGS. 3 and 4, the VDM controller 255b may be configured to detect rogue endpoints operating on the PCIe bus 265. In the illustrated embodiment, VDM controller 225b is a separate component from the service processor 255a. In such embodiments, VDM controller 255b may be a micro-controller or integrated circuit that is configured to implement VDM communications via a PCIe bus 265. In some embodiments, the VDM controller 255b may be an integrated component of the service processor 255a, such as a peripheral SoC feature that is provided by the service processor 255a.

In detecting rogue devices on PCIe bus 265, VDM controller 255b may interoperate with corresponding endpoint VDM controllers 220a, 225a, 230a that implement the VDM communications of the respective managed devices 220, 225, 230 via the PCIe bus 265. Similar to the VDM controller 255b utilized by the remote access controller 255, the endpoint VDM controllers 220a, 225a, 230a may be implemented as a dedicated microcontroller for communicating sideband MCTP messages with the remote access controller 255, or endpoint VDM controllers 220a, 225a, 230a may be integrated SoC functions of a processor of the respective managed device endpoints 220, 225, 230.

As described in additional detail with regard to FIG. 5, the remote access controller 255 may be configured to detect resets of the PCIe bus 265 that render the VDM controller 255b inoperable. In such scenarios, as long as a reset of the PCIe bus 265 remains undetected, the VDM controller 255b remains inoperable and MCTP device management communications by the managed components 220, 225, 230 may be dropped. Accordingly, remote access controller 255 may be configured to minimize the downtime of the VDM controller 255b, and the resulting dropped VDM communications, due to resets of the PCIe bus 265.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

FIG. 3 is a swim-lane diagram illustrating certain operations of a remote management controller and a device management bus endpoint in detecting rogue devices on a device management bus. In various embodiments, a VDM controller 305, such as the VDM controller 255b operating on behalf of remote access controller 255, may detect rogue devices operating on a PCIe VDM bus utilized for sideband administration of a managed device endpoint 310 of the PCIe VDM bus.

As described in additional detail with regard to FIG. 4, VDM controller 305 may generate messages that configure 315 the managed device as an endpoint 310 of the PCIe VDM bus by providing the endpoint with a bus address and by also providing the endpoint with a unique token 320. The token may be used by the endpoint 310 to authenticate 330 subsequent transactions 325 on the PCIe VDM bus as originating from the VDM controller 305. Each endpoint 310 is configured to track the unauthorized messages received on the PCIe VDM bus that were not authenticated as originating from the VDM controller 305.

The VDM controller 305 may periodically query 335 the endpoints 310 for such unauthorized messages received from rogue endpoints. The remote access controller may identify and disable such rogue endpoints from operating on the PCIe VDM bus. In certain embodiments, the VDM controller 305 may periodically regenerate 340 new unique tokens for use by each endpoint 310 in authenticating communications on the PCIe VDM bus as being sent by the VDM controller 305, thus defending against rogue endpoints utilizing replay attacks.

FIG. 4 is a flowchart describing certain steps of a method, according to some embodiments, for detecting rogue endpoints on a device management bus, such as a PCIe VDM bus used to communicate MCTP messages. As described, certain bus protocols may prevent a bus owner from blocking endpoints from sending messages on a bus. Endpoints on the device management bus may exploit this vulnerability, either purposefully or due to a malfunction, by flooding the device management bus with traffic.

The embodiment illustrated in FIG. 4 begins at step 405 with the remote access controller initiating discovery of the endpoints on a device management bus. The remote access controller may provide monitoring and administrative capabilities for an IHS, such as described with regard to FIGS. 1 and 2. Accordingly, the remote access controller may utilize a sideband bus to communicate with managed devices. In certain embodiments, the sideband bus may be a PCIe VDM bus used to communicate MCTP messages that are used in the monitoring and administration of the managed devices by the remote access controller. In such embodiments, the remote access controller may utilize MCTP endpoint discovery functions in order to identify all endpoints that are coupled to the device management bus.

At step 410, the remote access controller generates a token for each of the discovered endpoints of the device management bus. In certain embodiments, each token generated by the remote access controller may be a unique value, such as a random value generated by the remote access controller. In this manner, the token generated by the remote access controller for an individual endpoint serves to uniquely identify the remote access controller to that individual endpoint.

The remote access controller proceeds to configure each of the discovered endpoints, at step 415, by generating a configuration command for each of the endpoints. The information provided in a configuration command may be used to configure a discovered device as an endpoint on the device management bus. In certain embodiments, the configuration command includes the unique token generated by the remote access controller for the endpoint that is being configured. The configuration command may also include a unique identifier assigned to each endpoint, where the unique identifier serves as a bus address for each endpoint on the device management bus.

At step 420, the remote access controller transmits a configuration command to each of the discovered endpoints via the device management bus. As described with regard to FIG. 2, each managed device may include a controller that implements the MCTP communications on a device management bus. For instance, each managed device may utilize a VDM controller that implements PCIe VDM communications used to transmit MCTP messages. At step 425, the VDM controller of a managed device receives the configuration command generated for that particular managed device by the remote access controller.

As described, the configuration command received by an endpoint may specify a bus address for the endpoint and may also include the unique token generated for the endpoint. Upon receipt of the configuration command by a VDM controller of the managed device, the bus address may be used for configuring the VDM controller as an endpoint on the device management bus. In certain embodiments, the VDM controller may be configured to capture the bus address of the sender of the configuration command, this sender being the remote access controller bus owner of the device management bus. The endpoint VDM controller may store the captured bus address of the remote access controller and the unique token provided in the configuration command to a volatile memory.

At step 430, an endpoint VDM controller monitors the device management bus and the receives a message directed to the managed device endpoint. Upon receipt of a message, the endpoint VDM controller determines the bus address of the message sender. At step 435, the endpoint VDM controller determines whether the bus address of the message sender matches the stored bus address of the remote access controller bus owner. If the message sender's bus address does not indicate the message is from the remote access controller, at step 440 the message is discarded by the endpoint VDM controller. This verification of the sender's bus address provides a first factor of authentication of a message sender.

As described, certain bus protocols do not prevent endpoints from sending messages, thus leaving the bus vulnerable to rogue endpoint devices. In certain scenarios, such rogue endpoints may result from a malfunction that results in repeated unnecessary message broadcasts that may reduce the available bandwidth of the bus. In other scenarios, rogue endpoints may be the result of malicious actors and may seek to spoof the identity of other endpoints.

Accordingly, at step 465, the endpoint VDM controller determines if a token provided in the received message matches the unique token provided to endpoint VDM controller by the remote access controller via the configuration command. The token provides a second factor of authentication of a message sender, thus allowing the endpoint VDM controller to be assured a message sender is the remote access controller. If the bus address of the sender matches the stored bus address of the remote access controller and the token included in the message matches the unique token stored by the endpoint VDM controller, at step 470, the endpoint VDM controller processes the message, now authenticated as being sent by the remote access controller.

If the token provided in the message does not match the unique token stored by the VDM controller, at step 440, the endpoint VDM controller discards the message. For messages discarded either due to being sent by unauthorized bus address, or for not providing a token matching the token stored by the endpoint VDM controller, at step 445, the endpoint VDM controller stores the unauthorized sender information of the discarded message, such as in a log maintained by the endpoint VDM controller.

At step 450, the remote access controller may periodically query the endpoint VDM controllers for any unauthorized sender information that has been logged by each of the VDM controllers. At step 455, the remote access controller utilizes the sender information from the logs to identify the bus endpoints that transmitted the unauthorized messages directly to other endpoints. Once identified, at step 460, the remote access controller may disable the device management bus endpoints that have sent unauthorized messages on the device management bus.

As described, a PCIe bus reset may result in disabling a VDM controller responsible for implementing PCIe VDM communications on behalf of a remote access controller. During such intervals, the remote access controller does not receive transmissions on the PCIe VDM bus and is thus unable to prevent rogue devices from flooding other endpoints on the PCIe VDM bus with bus traffic. FIG. 5 is a flowchart describing certain steps of a method, according to some embodiments, for detecting and recovering from the reset of a device management bus. The embodiment of FIG. 5 may begin at step 505 with the reset of the PCIe VDM bus, such as the sideband device management bus 265 described with regard to FIG. 2 as coupling a remote access controller 255 and managed devices 220, 225, 230.

In certain scenarios, a PCIe VDM bus may be reset without notification in a manner that results in a corresponding reset of the VDM controller utilized by the remote access controller, such that the VDM controller is effectively disabled at step 510. During such periods of inoperability by the VDM controller, messages sent from the managed devices on the PCIe VDM bus may be retried, but these messages will be eventually dropped. Even short periods of inoperability by the VDM controller may result in large numbers of messages being dropped.

In order to minimize the duration of such periods of inoperability of the PCIe VDM communications due to resets of the PCIe bus, at step 515, the remote access controller may seek to identify resets of the PCIe VDM bus as soon as possible. In some embodiments, the remote access controller may be configured to query the status of the VDM controller upon detecting any file operation to be conducted by the remote access controller. For instance, the remote access controller may integrate a query of the VDM controller into each read, write and polling operation of the remote access controller.

Configured in such a manner, at step 520, the remote access controller queries the VDM controller in order to determine whether the PCIe VDM bus has been reset. In some scenarios, the resetting of the PCIe VDM bus results in a reset of the VDM controller. A reset of the VDM controller may result in clearing of hardware registers of the VDM controller that are used to store configuration information necessary for the operation of the VDM controller, thus disabling the VDM controller in some cases. In some embodiments, the remote access controller may query such configuration registers of the VDM controller at step 520 in order to determine whether any of the configuration registers, or if particular configuration registers, have been cleared, thus indicating a reset of the PCIe VDM bus.

If, at step 525, the configuration registers necessary for the VDM controller's operation have not been cleared, the PCIe VDM bus is operational and, at step 530, the remote access controller processes the file operation that triggered the scanning of the configuration registers. Subsequent file operations detected by the remote access controller will similarly result in another query of the configuration registers of the VDM controller. However, if scanning of the configuration registers indicates those registers have been cleared, at step 535, the remote access controller initiates re-initialization of the VDM controller. As part of such a reinitialization, the configuration registers of the VDM controller are populated and the operations of the VDM controller may resume. In some embodiments, reinitialization of the VDM controller may be followed at step 540 with the discovery of the endpoints of the reset PCIe VDM bus and the configuration of the endpoint VDM controllers for detection of rogue endpoint devices, such as described with regard to FIG. 4.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for detecting rogue devices on a device management bus, the system comprising:
   a communications controller configured as a bus owner of the device management bus and further configured to:
      initiate discovery of a plurality of managed devices coupled to the device management bus;
      generate a unique identifier for each of the managed devices;
      generate a bus configuration message including the respective unique identifier generated for each managed device; and
      transmit the bus configuration messages to the respective managed devices; and
   the plurality of managed devices, each configured as an endpoint of the device management bus based on a received bus configuration message, and each further configured to;
      capture a bus address of the communications controller from the received bus configuration message;
      receive, on the device management bus, a first message from a sender at a first bus address, the message including a sender identifier; and
      authenticate the sender based on evaluation of the first bus address against the captured bus address, and further based on evaluation of the sender identifier against the unique identifier provided to the respective managed device; and
   a remote access controller configured to query a plurality of configuration registers of the communications controller upon every file operation conducted by the remote access controller.

2. The system of claim 1, wherein each of the plurality of managed devices is further configured to store the first bus address if the sender is not authenticated.

3. The system of claim 2, wherein each of the plurality of managed devices is further configured to discard the first message if the sender is not authenticated.

4. The system of claim 3, wherein the communications controller is further configured to query the plurality of managed devices for rogue endpoints.

5. The system of claim 4, wherein the communications controller is further configured to disable the rogue endpoints on the device management bus.

6. The system of claim 1, wherein the device management bus is a PCIe (Peripheral Component Interconnect express) VDM (Vendor Defined Message) bus for communicating MCTP (Management Component Transport Protocol) messages.

7. The system of claim 1, wherein the communications controller comprises a VDM (Vender Defined Message) controller.

8. The system of claim 1, wherein the remote access controller is further configured to re-initialize the communications controller upon determining the plurality of configuration registers have been cleared.

9. A method for detecting rogue devices on a device management bus by a communications controller configured as a bus owner, the method comprising:
- initiating discovery of a plurality of managed devices coupled to the device management bus;
- generating a unique identifier for each of the managed devices;
- generating a bus configuration message including the respective unique identifier generated for each managed device;
- transmitting the bus configuration messages to the respective managed devices, wherein each of the managed devices is configured to: capture a bus address of the communications controller from the received bus configuration message; receive, on the device management bus, a first message from a sender at a first bus address, the message including a sender identifier; and
- authenticate the sender based on evaluation of the first bus address against the captured bus address, and of the sender identifier against the unique identifier provided to the respective managed device; and
- querying, by a remote access controller, a plurality of configuration registers of the communications controller upon every file operation conducted by the remote access controller.

10. The method of claim 9, wherein each of the plurality of managed devices is further configured to store the first bus address if the sender is not authenticated.

11. The method of claim 10, wherein each of the plurality of managed devices is further configured to discard the first message if the sender is not authenticated.

12. The method of claim 11, further comprising: querying, by the communications controller, the plurality of managed devices for rogue endpoints.

13. The method of claim 12, further comprising: disabling the rogue endpoints on the device management bus.

14. The method of claim 9, wherein the device management bus is a PCIe (Peripheral Component Interconnect express) VDM (Vendor Defined Message) bus for communicating MCTP (Management Component Transport Protocol) messages.

15. The method of claim 9, wherein the communications controller comprises a VDM (Vender Defined Message) controller.

16. The method of claim 9, further comprising:
reinitializing, by the remote access controller, the communications controller upon determining the plurality of configuration registers have been cleared.

17. A computer-readable storage device configured for detecting rogue devices on a device management bus by a communications controller configured as a bus owner of the device management bus and having program instructions stored thereon that, upon execution by one or more processors, cause the one or more processors to:
- initiate discovery of a plurality of managed devices coupled to the device management bus;
- generate a unique identifier for each of the managed devices;
- generate a bus configuration message including the respective unique identifier generated for each managed device;
- transmit the bus configuration messages to the respective managed devices, wherein each of the managed devices is configured to: capture a bus address of the communications controller from the received bus configuration message; receive, on the device management bus, a first message from a sender at a first bus address, the message including a sender identifier; and
authenticate the sender based on evaluation of the first bus address against the captured bus address, and of the sender identifier against the unique identifier provided to the respective managed device; and
- querying, by a remote access controller, a plurality of configuration registers of the communications controller upon every file operation conducted by the remote access controller.

18. The computer-readable storage device configured of claim 17, the program instructions further causing the one or more processors to query the plurality of managed devices for rogue endpoints identified by the managed devices as unauthenticated message senders.

19. The computer-readable storage device configured of claim 18, the program instructions further causing the one or more processors to disable the rogue endpoints on the device management bus.

20. The computer-readable storage device configured of claim 17, wherein the device management bus is a PCIe (Peripheral Component Interconnect express) VDM (Vendor Defined Message) bus for communicating MCTP (Management Component Transport Protocol) messages.

* * * * *